US008548754B2

(12) United States Patent
Iwamoto et al.

(10) Patent No.: US 8,548,754 B2
(45) Date of Patent: Oct. 1, 2013

(54) FLOWMETER

(75) Inventors: Ryuji Iwamoto, Nara (JP); Hajime Miyata, Shiga (JP); Youichi Itou, Nara (JP); Daisuke Bessyo, Shiga (JP); Kenichi Kamon, Shiga (JP)

(73) Assignee: Panasonic Corporation, Osaka (JP)

( * ) Notice: Subject to any disclaimer, the term of this patent is extended or adjusted under 35 U.S.C. 154(b) by 330 days.

(21) Appl. No.: 12/921,329

(22) PCT Filed: Mar. 2, 2009

(86) PCT No.: PCT/JP2009/000938

§ 371 (c)(1),
(2), (4) Date: Sep. 7, 2010

(87) PCT Pub. No.: WO2009/110214

PCT Pub. Date: Sep. 11, 2009

(65) Prior Publication Data

US 2011/0004423 A1 Jan. 6, 2011

(30) Foreign Application Priority Data

Mar. 7, 2008 (JP) ................................ 2008-058790

(51) Int. Cl.
*G01M 3/28* (2006.01)
*G01F 1/363* (2006.01)
*G01F 1/698* (2006.01)
*G01F 1/88* (2006.01)

(52) U.S. Cl.
USPC .................. 702/47; 73/40.5; 73/49.1; 73/592

(58) Field of Classification Search
USPC ........................................................... 702/47
See application file for complete search history.

(56) References Cited

U.S. PATENT DOCUMENTS 4,796,466 A * 1/1989 Farmer ....................... 73/40.5 R
5,261,268 A * 11/1993 Namba ...................... 73/40.5 R
5,272,646 A * 12/1993 Farmer ........................... 702/51

(Continued)

FOREIGN PATENT DOCUMENTS

JP 07-027659 A 1/1995
JP 2003-149075 A 5/2003

(Continued)

OTHER PUBLICATIONS

International Search Report for International Application No. PCT/JP2009/000938, dated May 19, 2009, 2 pages.

*Primary Examiner* — Tung S Lau
*Assistant Examiner* — Stephanie Chang
(74) *Attorney, Agent, or Firm* — Brinks Hofer Gilson & Lione

(57) ABSTRACT

Detecting a leak, or the like, with high accuracy on the basis of pressure and a flow volume acquired during use of fluid is made possible. A volume of gas flowing through a flow path 102 is measured by a flow volume measurement unit 106, and pressure is measured by a pressure measurement unit 108. Measured flow data and measured pressure data are input to an analysis unit 112, to thus analyze following of a pressure change by a flow volume change. A determination showing that a following flow volume change is present, that a following flow volume change is not present, or that a following flow volume change is uncertain is made according to a magnitude correlation between an amount of pressure change of a predetermined level or more and an amount of flow volume change.

11 Claims, 6 Drawing Sheets

(56) References Cited

U.S. PATENT DOCUMENTS

| | | | | | |
|---|---|---|---|---|---|
| 5,315,862 | A * | 5/1994 | Hasselmann | .............. | 73/40.5 R |
| 5,857,459 | A * | 1/1999 | Snow et al. | .............. | 128/204.21 |
| 6,082,182 | A * | 7/2000 | Fierro et al. | ............... | 73/40.5 R |
| 6,098,449 | A * | 8/2000 | Knoblach et al. | ............ | 73/53.01 |
| 6,435,010 | B1 * | 8/2002 | Johnson et al. | ................... | 73/40 |
| 6,460,565 | B1 * | 10/2002 | Titus | ............................. | 137/487 |
| 7,970,557 | B2 * | 6/2011 | Sameda et al. | .................. | 702/45 |
| 7,987,698 | B2 * | 8/2011 | Nakano et al. | ............. | 73/40.5 R |
| 8,166,999 | B2 * | 5/2012 | Ueki et al. | ................. | 137/487.5 |
| 2006/0174707 | A1 * | 8/2006 | Zhang | ............................. | 73/592 |
| 2008/0270045 | A1 | 10/2008 | Miyata et al. | | |
| 2010/0269596 | A1 * | 10/2010 | Miyata et al. | .............. | 73/861.18 |
| 2011/0010111 | A1 * | 1/2011 | Miyata et al. | ................... | 702/47 |

FOREIGN PATENT DOCUMENTS

| | | | |
|---|---|---|---|
| JP | 2006-313114 | A | 11/2006 |
| JP | 2007-093459 | A | 4/2007 |
| JP | 2009139309 | A * | 6/2009 |

* cited by examiner (a) FOLLOWING FLOW VOLUME CHANGE IS PRESENT (b) FOLLOWING FLOW VOLUME CHANGE IS NOT PRESENT (c) FOLLOWING FLOW VOLUME CHANGE IS UNCERTAIN (a) CONSECUTIVE DIFFERENCE METHOD (b) STANDARD VALUE DIFFERENCE METHOD (a) CONSECUTIVE DIFFERENCE METHOD (b) STANDARD VALUE DIFFERENCE METHOD

FIG. 6

| SYMBOLS | $\Delta Qi/\Delta qi$ (L/h) |
|---|---|
| A | 100 ~ |
| B | 50 ~ 100 |
| C | -50 ~ 50 |
| D | -100 ~ -50 |
| E | ~ -100 |

(a) FIXING OF THRESHOLD VALUE

| FIXING SPECIFICS | | FIXING METHOD |
|---|---|---|
| FOLLOWING FLOW VOLUME CHANGE IS PRESENT | FIX DETERMINATION | A OCCURS "m" TIMES |
| | | B OCCURS "n" TIMES |
| FOLLOWING FLOW VOLUME CHANGE IS NOT PRESENT | DO NOT FIX DETERMINATION | |
| FOLLOWING FLOW VOLUME CHANGE IS UNCERTAIN | | |

(b1-1) SIMPLE FIXING METHOD (CONSECUTIVE DIFFERENCE METHOD)

| FIXING SPECIFICS | | FIXING METHOD |
|---|---|---|
| FOLLOWING FLOW VOLUME CHANGE IS PRESENT | DO NOT FIX DETERMINATION | |
| FOLLOWING FLOW VOLUME CHANGE IS NOT PRESENT | FIX DETERMINATION | C OCCURS |
| FOLLOWING FLOW VOLUME CHANGE IS UNCERTAIN | DO NOT FIX DETERMINATION | |

(b1-2) SIMPLE FIXING METHOD (STANDARD VALUE DIFFERENCE METHOD)

| FIXING SPECIFICS | | FIXING METHOD |
|---|---|---|
| FOLLOWING FLOW VOLUME CHANGE IS PRESENT | FIX DETERMINATION | A OCCURS 'm' TIMES, AND C, D, E DO NOT OCCUR |
| | | B OCCURS 'n' TIMES, AND C, D, E DO NOT OCCUR |
| FOLLOWING FLOW VOLUME CHANGE IS NOT PRESENT | DO NOT FIX DETERMINATION | |
| FOLLOWING FLOW VOLUME CHANGE IS UNCERTAIN | | |

(b2-1) COMPLICATE FIXING METHOD (CONSECUTIVE DIFFERENCE METHOD)

| FIXING SPECIFICS | | FIXING METHOD |
|---|---|---|
| FOLLOWING FLOW VOLUME CHANGE IS PRESENT | DO NOT FIX DETERMINATION | |
| FOLLOWING FLOW VOLUME CHANGE IS NOT PRESENT | FIX DETERMINATION | C OCCURS, AND A, B, E DO NOT OCCUR |
| | | C OCCURS, AND A, E DO NOT OCCUR |
| FOLLOWING FLOW VOLUME CHANGE IS UNCERTAIN | DO NOT FIX DETERMINATION | |

(b1-2) SIMPLE FIXING METHOD (STANDARD VALUE DIFFERENCE METHOD)

FLOWMETER

This application is a U.S. national stage entry of PCT/JP2009/00938, filed Mar. 2, 2009, which claims priority to Japanese Patent Application No. 2008-058790, filed Mar. 7, 2008, the entire contents of each of which are incorporated herein by reference.

TECHNICAL FIELD

The present invention relates to a flowmeter capable of detecting a leak, or the like, on the basis of pressure and a flow volume achieved during use of fluid.

BACKGROUND ART

In relation to a flowmeter that measures a volume of fluid flow, such as gases, a device that detects a leak, or the like, on the basis of a volume of fluid flow achieved during use of fluid has hitherto been proposed for a safety function of effecting a cutoff in the event of occurrence of a failure, such as a leak. Another proposed device detects a flow volume and pressure achieved during use of fluid and also detects a leak, or the like, on the basis of the flow volume and pressure (see; for instance, Patent Document 1).

The related-art example device has gas flow volume detection means, a gas pressure sensor, and gas pressure variation means. When a large flow volume is detected or when a gas appliance cannot be determined, gas supply pressure is caused to fluctuate, and occurrence of changes in flow volume corresponding to pressure fluctuations is detected, to thus detect a leak, or the like.

Patent Document 1: JP-A-2003-149075

Problem that the Invention is to Solve

The related-art example of Patent Document 1 discloses an example for determining a flow volume and pressure by means of a simple waveform, and there has been made an alternative determination as to whether or not a change is present in the volume of gas flow. However, in an actual use environment, changes in flow volume and pressure are complicate. A contrivance that copes with complicate waveforms has not been made in the related art, and a sufficient determination cannot be made on occasions. Moreover, when an attempt is made to quantitatively determine changes in flow volume corresponding to pressure fluctuations, a correlation existing between a flow volume Q and pressure P is expressed as $P=aQ^2$. Since pressure is proportional to a square of flow volume, square operation is required, which poses a problem of an increase in operation load.

SUMMARY OF THE INVENTION

The present invention has been conceived in view of the circumstance and aims at providing a flowmeter capable of determining a leak, or the like, from pressure and a flow volume achieved during use of fluid with high accuracy.

Means for Solving the Problem

A flowmeter of the present invention comprises: a flow measurement unit that measures a volume of fluid flowing through a flow path; a pressure measurement unit that measures pressure of the fluid; an analysis unit that analyzes following of a pressure change by a flow volume change by inputting the measured flow data and the measured pressure data and that makes a determination showing that a following flow volume change is present, that a following flow volume change is not present, or that a following flow volume change is uncertain, according to a magnitude correlation between an amount of pressure change of a predetermined level or more and an amount of flow volume change; and a processing unit that performs corresponding processing according to a result of analysis performed by the analysis unit.

A determination showing that a following flow volume change is present, a determination showing that a following flow volume change is not present, or a determination showing that a following flow volume change is uncertain is thereby made, so that a leak, or the like, can be detected with high accuracy. On this occasion, a magnitude correlation between the amount of pressure change of a predetermined level or more and the amount of flow volume change is determined, thereby making it possible to cope with complicate flow volume and pressure changes occurring in an actual use environment. Thus, an accuracy of determination can be enhanced.

The present invention also includes the foregoing flowmeter in which the analysis unit computes the amount of flow volume change at each predetermined timing by means of a consecutive difference method for determining a difference between a value of a current flow volume and a value of a preceding flow volume, thereby determining the following flow volume change.

An amount of flow volume change responsive to an amount of pressure change of a predetermined level or more can thereby be determined from a difference between a value of a current flow volume and a value of a preceding flow volume at each predetermined timing, and a following flow volume change can be determined with superior accuracy.

The present invention also includes the foregoing flowmeter in which the analysis unit computes the amount of flow volume change by means of a standard value difference method for determining a difference between a value of a current flow volume and a predetermined standard value at each predetermined timing, thereby determining the following flow volume change.

The amount of flow volume change responsive to an amount of pressure change of a predetermined level or more can thereby be determined from a difference between a value of a current flow volume and a predetermined standard value at each predetermined timing, and a following flow volume change can be determined with superior accuracy.

The present invention also includes the flowmeter in which the analysis unit uses a method when making the determination showing that a following flow volume change is present and another method when making the determination showing that a following flow volume change is not present, thereby determining the following flow volume change.

It thereby becomes possible to make a determination by means of a method appropriate for a determination condition of a state where a following flow volume change is present and a determination condition of a state where a following flow volume change is not present, so that an accuracy of determination can be enhanced further.

The present invention also includes the flowmeter in which, in relation to the determination showing that a following flow volume change is present, the analysis unit computes the amount of flow volume change by means of a consecutive difference method for determining a difference between a value of a current flow volume and a value of preceding flow volume at each predetermined timing, thereby determining the following flow volume change.

In connection with a determination showing that a following flow volume change is present, an amount of flow volume change can be computed by means of a method appropriate for a determination condition, so that an accuracy of determination can be enhanced.

The present invention also includes the flowmeter in which, in relation to the determining showing that a following flow volume change is not present, the analysis unit computes the amount of flow volume change by means of a standard value difference method for determining a difference between a value of a current flow volume and a predetermined standard value at each predetermined timing, thereby determining the following flow volume change.

In connection with a determination showing that a following flow volume change is not present, an amount of flow volume change can be computed by means of a method appropriate for a determination condition, so that an accuracy of determination can be enhanced.

The present invention also includes the flowmeter in which, when made a determination showing that a flow volume change follows a pressure change, the analysis unit determines a fluid leak.

It thereby becomes possible to determine a fluid leak with superior accuracy by means of the determination showing that a following flow volume change is present, so that a determination accuracy of detection of a leak can be enhanced.

The present invention also includes the flowmeter in which the analysis unit has an appliance determination function of determining an appliance that uses fluid according to the measured flow volume and determines a fluid leak when determined that a flow volume change follows a pressure change and when operation of an appliance not having a pressure regulator (a governor) is not detected.

It thereby becomes possible to determine a fluid leak with superior accuracy by means of the appliance determination and the determination showing that a following flow volume change is present, so that a determination accuracy of detection of a leak can be enhanced.

The present invention provides a flow volume measurement method comprising: a flow volume measurement step of measuring a volume of fluid flowing through a fluid path by means of a flowmeter; a pressure measurement step of measuring pressure of the fluid by means of a barometer; an analysis step of analyzing following of a pressure change by a flow volume change by inputting the measured flow data and the measured pressure data and making a determination showing that a following flow volume change is present, that a following flow volume change is not present, or that a following flow volume change is uncertain according to a magnitude correlation between an amount of pressure change of a predetermined level or more and an amount of flow volume change; and a processing step of performing corresponding processing according to the analysis result.

The present invention also provides a program for causing a computer that controls a flowmeter to perform processing pertaining to the respective steps mentioned above. The present invention also provides a fluid supply system using the flowmeter, the flow volume measurement method, and the program.

Advantage of the Invention

The present invention can provide a flowmeter capable of determining a leak, or the like, from pressure and a flow volume achieved during use of fluid with high accuracy.

BRIEF DESCRIPTION OF THE DRAWINGS

FIG. 6 is a view for describing example methods for fixing a following flow volume change.

DESCRIPTIONS OF THE REFERENCE NUMERALS

100 GAS METER
102 FLOW PATH
104 CUTOFF VALVE
106 FLOW VOLUME MEASUREMENT UNIT
108 PRESSURE MEASUREMENT UNIT
110 FLOW VOLUME COMPUTING UNIT
112 ANALYSIS UNIT
114 PROCESSING UNIT
120 STORAGE UNIT
122 DISPLAY UNIT
124 COMMUNICATION UNIT
151, 152, 153 GAS APPLIANCE
200 MONITORING CENTER
300 COMMUNICATION LINE

DETAILED DESCRIPTION OF THE PREFERRED EMBODIMENTS

Figure 1:
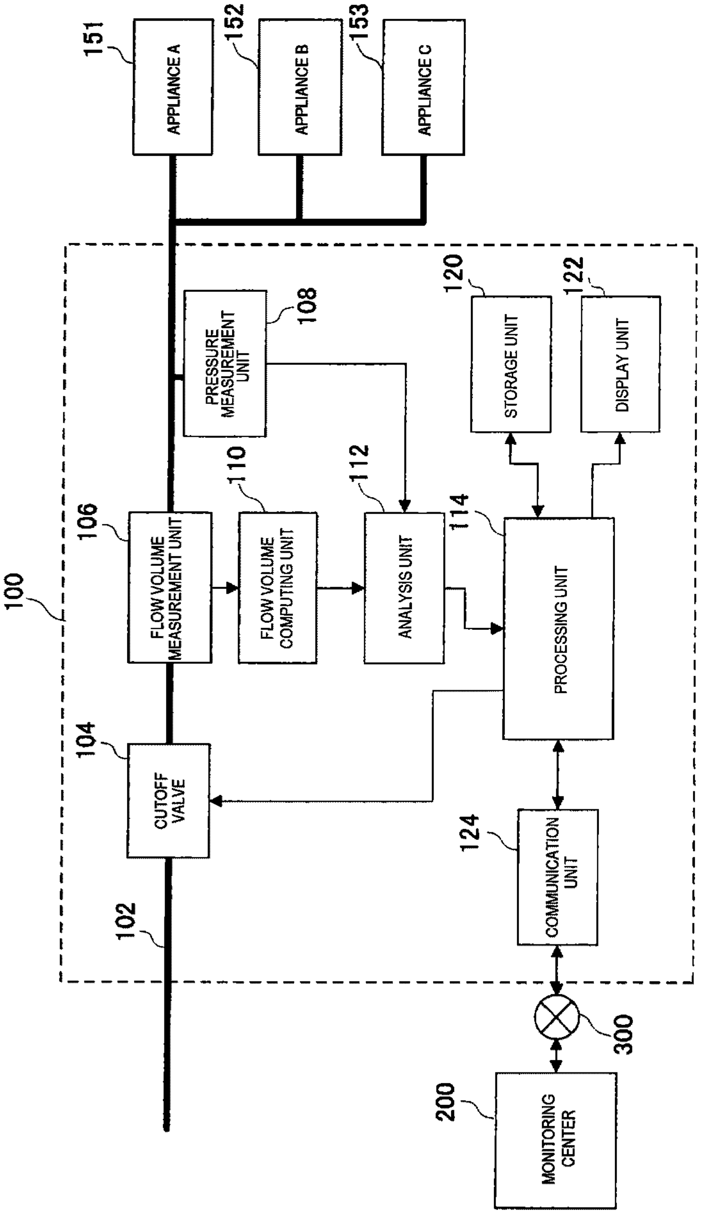
FIG. 1 is a block diagram showing a configuration of a gas supply system including a flowmeter of an embodiment of the present invention.

FIG. 1 is a block diagram showing a configuration of a gas supply system including a flowmeter of an embodiment of the present invention. The gas supply system of the present embodiment has a gas meter 100 serving as a flowmeter and a monitoring center 200 that performs monitoring of a safety function relating to a gas supply, management of a state of use achieved in an individual user, and others. The gas meter 100 is installed outside or inside of a building where gas appliances are provided. The monitoring center 200 is an apparatus that is installed in a management unit of a gas company, a propane gas supplier, or a company relevant thereto and that controls the gas meters 100 installed in individual buildings in a centralized manner. The gas meters 100 and the monitoring center 200 are connected to each other in a communicable manner by way of a communication line 300, such as a wireless communication line, a telephone line, the Internet, and others, and can exchange various signals and data therebetween.

The individual gas meter 100 is connected to a flow path 102 supplied with gas. A cutoff valve 104, a flow volume measurement unit 106, and a pressure measurement unit 108 are disposed in the flow path 102. The gas meter 100 is equipped with a flow volume computing unit 110, an analysis unit 112, a processing unit 114, a storage unit 120, a display unit 122, and a communication unit 124. A function of the flow volume computing unit 110, that of the analysis unit 112, and that of the processing unit 114 are individually implemented by means of an arithmetic processing unit including a processor, such as a microcomputer, and memory.

One gas appliance or more various gas appliances A151, B152, and C153, such as a gas hot plate, a fan heater, a water heater, and a fan heater, are connected to a downstream area of the flow path of the gas meter 100. For instance, the gas appliance A151 is assumed to be a gas hot plate, or the like, not having a governor that is a pressure regulator, and the gas appliance B152 is assumed to be a water heater having a governor.

The flow volume measurement unit 106 has a flowmeter that meters a volume of gas flowing through the flow path 102 and is built from an ultrasonic flowmeter, or equivalent. An example configuration for a case where an ultrasonic flowmeter is used as the flow volume measurement unit 106 is described in the embodiment. However, other various flow volume measurement means, such as a fluidic meter, can also be used, so long as the means can measure the volume of gas flow at predetermined time intervals. The flow volume measurement unit 106 lets an ultrasonic transmitter and an ultrasonic receiver, which are disposed at an upstream position and a downstream position along the flow path 102, alternately transmit and receive an ultrasonic wave at a given time interval (e.g., every two seconds, or the like) and determine a difference between a propagation time of a forward ultrasonic wave and a propagation time of a backward ultrasonic wave with respect to a flow of fluid, thereby determining flow speed and flow volume of fluid to be measured from the propagation time difference.

The flow volume computing unit 110 computes the volume of gas flow used and a flow pattern corresponding to a time consumed to measure the volume of gas flow, by use of a flow volume measurement value output from the flow volume measurement unit 106. Flow data pertaining to a flow volume, such as a computed, integrated flow volume and a flow pattern, and a time are output to the analysis unit 112. The thus-computed flow data are transferred from the analysis unit 112 to and stored in the storage unit 120 by way of the processing unit 114.

The pressure measurement unit 108 has a barometer, such as a pressure sensor, and measures gas pressure in the flow path 102. Pressure data generated by the pressure measurement unit 108 are output to the analysis unit 112. The thus-acquired pressure data are further transferred from the analysis unit 112 to and stored in the storage unit 120 by way of the processing unit 114. In addition to storing the flow data and the pressure data, the storage unit 120 can store various data.

The flow data and the pressure data generated through measurement are input to the analysis unit 112, where the flow data or a correlation between the flow data and the pressure data is analyzed, to thus carry out determination showing a gas appliance used, detection of a leak, and others. The analysis unit 112 analyzes, as characteristic analysis operation of the embodiment, the following of a pressure change by a change in flow volume. The processing unit 114 performs corresponding processing on the basis of a result of analysis performed by the analysis unit 112. Various practicable processing operations include transmitting a report to the monitoring center 200 performed by the communication unit 124 at the time of detection of an anomaly, including a gas leak; shutting off a gas supply performed by the cutoff valve 104 at the time of detection of the anomaly; displaying information, such as an analysis result, performed by the display unit 122 at the time of detection of an anomaly and under normal conditions; and storing the analysis result in the storage unit 120; and others.

The communication unit 124 has a wired or wireless communication function and establishes communication with the monitoring center 200 by way of the communication line 300, thereby transmitting and receiving a signal and data. The display unit 122 has a display device, such as a liquid crystal display panel, and displays various pieces of information relevant to the gas meter.

Figure 2:
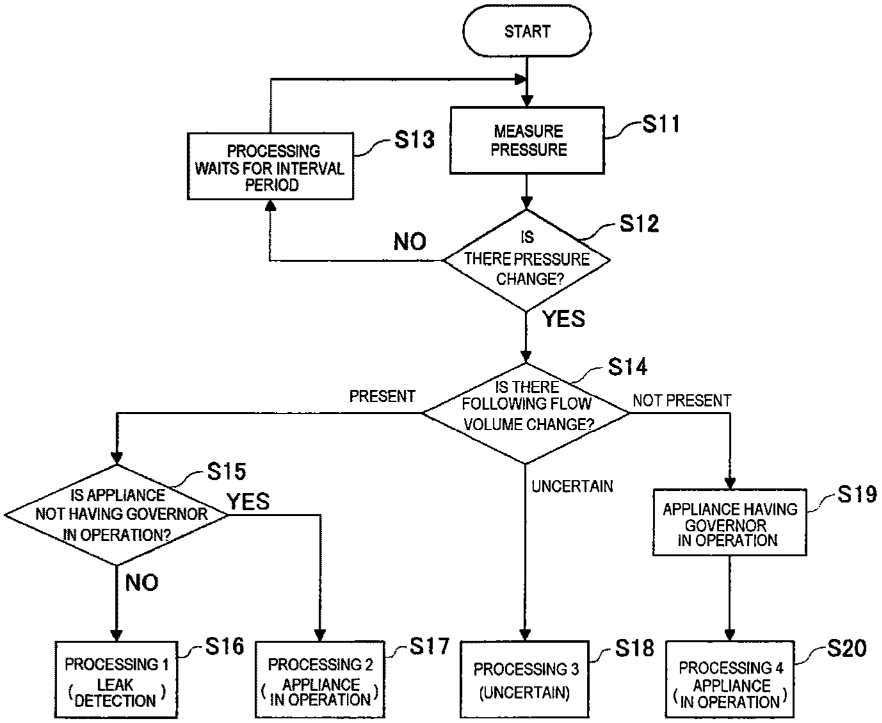
FIG. 2 is a flowchart showing processing procedures of operation pertaining to detection of a gas leak from a gas meter of the embodiment of the present invention.

Characteristic operation of a gas meter of the present embodiment is now described in detail. FIG. 2 is a flowchart showing processing procedures of operation pertaining to detection of a gas leak from the gas meter of the embodiment of the present invention.

First, the pressure measurement unit 108 measures pressure of a gas supply in the flow path 102 and outputs pressure data to the analysis unit 112 (step S11). The analysis unit 112 determines, from the input pressure data, whether or not there is a pressure change (step S12). In step S12, when there is no pressure change, processing waits for a predetermined interval period (step S13) and then returns to step S11. Thus, similar processing is repeated.

When a pressure change is determined to be present in step S12, the analysis unit 112 subsequently determines whether or not a pressure change is followed by a flow volume change (step S14). In step S14, when the flow volume change is determined to follow the pressure change, the analysis unit 112 further determines whether or not an appliance not having a governor, such as a gas hot plate, is in operation (step S15). When the appliance not having a governor is determined not to be in operation in step S15, occurrence of a gas leak is determined, and a result of analysis of gas leak detection is output to the processing unit 114. The processing unit 114 performs processing 1 corresponding to detection of a gas leak (step S16). Details of processing 1 include transmitting a report to the monitoring center 200 performed by the communication unit 124, shutting off the gas supply performed by the cutoff valve 104, and others.

In step S15, when the appliance not having a governor is in operation, the analysis unit 112 determines that the flow volume change is attributable to operation of the appliance not having a governor and outputs to the processing unit 114 an analysis result showing that the appliance not having a governor is in operation. The processing unit 114 performs processing 2 corresponding to the result showing that the appliance not having a governor is in operation (step S17). Specifics of processing 2 include displaying an operating status of an appliance by the display unit 122, transmitting a report to the monitoring center 200 by the communication unit 124, and others.

First, in step S14, when it is uncertain whether or not a following flow volume change is present, the analysis unit 112 outputs to the processing unit 114 an analysis result showing that a following flow volume change is uncertain. The processing unit 114 performs processing 3 corresponding to the result showing that a following flow volume change is uncertain (step S18). Specifics of processing 3 include transmitting a report to the monitoring center 200 by the communication unit 124.

In step S14, when a following flow volume change is not present flow volume, the analysis unit 112 determines that an appliance having a governor, such as a water heater, is in operation, and outputs to the processing unit 114 a result of analysis of the appliance having a governor (step S19). The processing unit 114 performs processing 4 corresponding to the result showing that the appliance having a governor is in operation (step S20). Specifics of processing 4 include displaying an operating state of an appliance by the display unit 122, transmitting a report to the monitoring center 200 by the communication unit 124, and others.

Processing 2 to 4 include a case where the analysis result is stored in only the storage unit 120, a case where nothing is particularly performed, and others.

Next, analysis operation of the analysis unit 112 of the embodiment is described in detail. In the embodiment, the analysis unit 112 analyzes the following of a pressure change by a flow volume change, on the basis of the flow data and the pressure data. Further, according to a magnitude correlation between an amount of pressure change of a predetermined level or more and an amount of flow volume change, the analysis unit makes and classifies a determination into three categories; namely, a determination showing that "a following flow volume change is present," a determination showing that "a following flow volume change is not present," and a determination showing that "a following flow volume change is uncertain."

Figure 3:
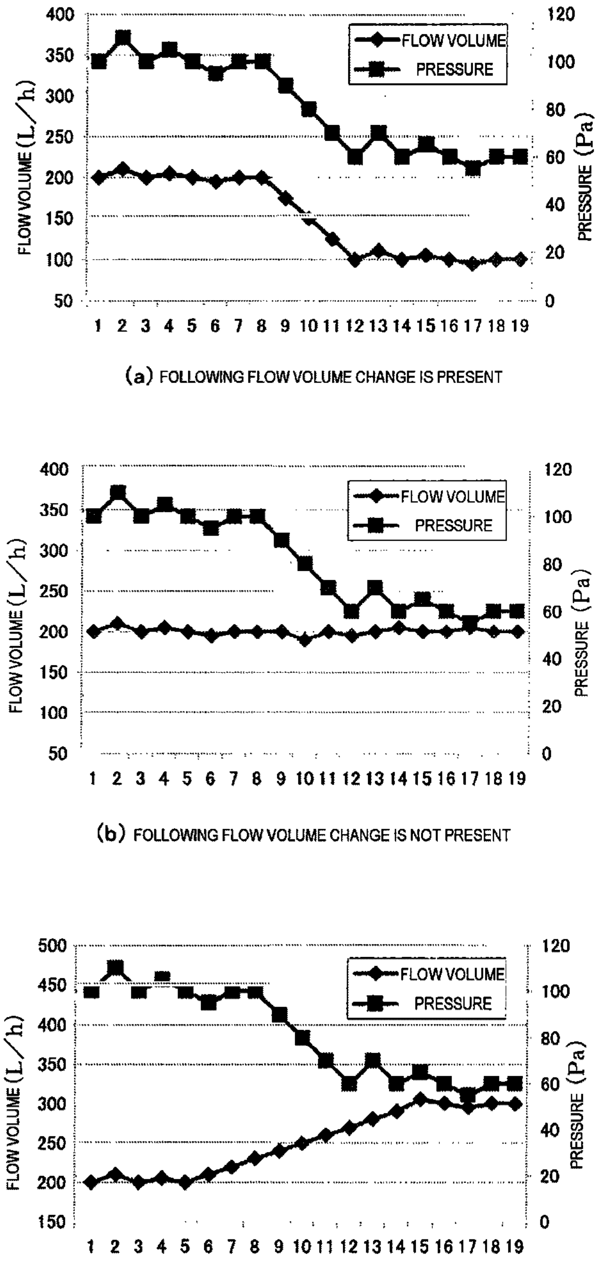
FIG. 3 is a view showing an example determination showing occurrence of a flow volume change following a pressure change performed by use of sample data.

FIG. 3 is a view showing an example determination showing a flow volume change following a pressure change performed through use of sample data. In FIG. 3, FIG. 3(*a*) shows a case of the category showing that a following flow volume change is present; FIG. 3(*b*) shows a case of the category showing that a following flow volume change is not present; and FIG. 3(*c*) shows a case of the category showing that a following flow volume change is uncertain. As shown in FIG. 3 (*a*), when a pressure change of a predetermined level or more (a pressure decrease) is followed by a flow volume change of a predetermined level or more (a decrease in flow volume), a determination showing "a following flow volume change is present" is made. As shown in FIG. 3(*b*), when a flow volume change following a pressure change of a predetermined level or more (a pressure decrease) is small, a determination showing that a following flow volume change is not present is made. As shown in FIG. 3(*c*), when a flow volume change (a decrease in flow volume) following a pressure change of a predetermined level or more (a pressure decrease) is uncertain, a determination showing that a following flow volume change is uncertain is made.

In addition to making a determination as to the following of the pressure change by the flow volume change, the analysis unit 112 makes an appliance determination as to a gas appliance used, thereby determining that an appliance not having a governor is in operation. The appliance determination as to the gas appliance can be made by means of various methods. For instance, the following methods are available.

First, an appliance is caused to start. Flow data, such as a flow volume acquired at startup of the appliance, a flow volume acquired during maximum combustion, a flow volume acquired during minimum combustion, a characteristic flow volume change acquired when an amount of combustion is controlled, and others, are stored as appliance-specific flow data in the storage unit 120. Subsequently, when the appliance is actually used, measured flow data and registered data are compared with each other, thereby determining an appliance. A check is then made as to whether or not a match is present between the measured flow data and the registered data in terms of a flow volume acquired at startup of the appliance; whether or not flow volume acquired during use of the appliance falls within a flow volume range from flow volume for minimum combustion to flow volume for maximum combustion; and whether or not a match is present between a flow volume change acquired when the amount of combustion is controlled and the registered characteristic; and the like, whereby an appliance can be identified.

Figure 4:
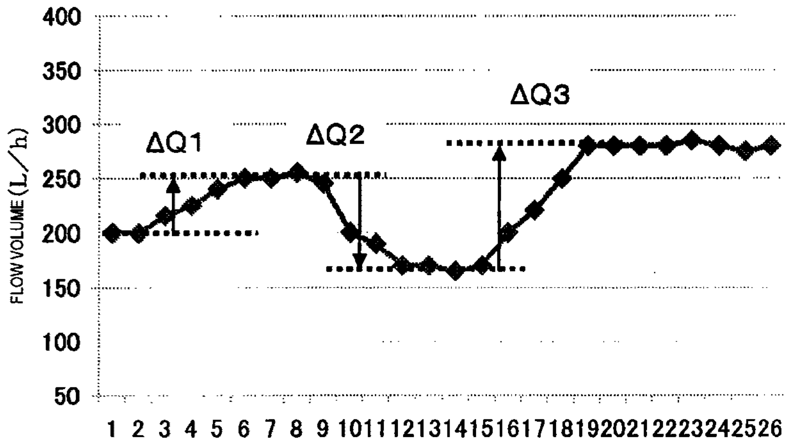
FIG. 4 is a view showing a different example method for calculating an amount of flow volume change.
Figure 4:
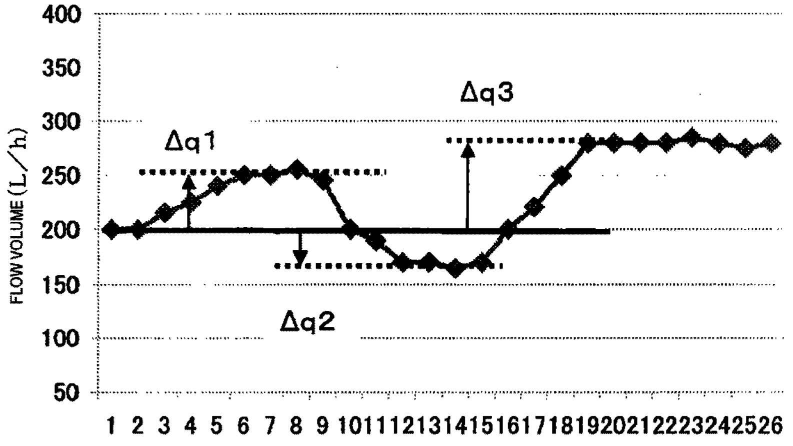

FIG. 4 is a view showing a different example method for computing a flow volume change. FIG. 4(*a*) shows example computation based on a consecutive difference method, and FIG. 4(*b*) shows example computation based on a standard value difference method. As shown in FIG. 4(*a*), under the consecutive difference method, flow volume differences ΔQ1, ΔQ2, and ΔQ3 from a respective preceding flow volume value are consecutively computed at every timing corresponding to a pressure change, and an amount of change is determined from the difference values. A shown in FIG. 4(*b*), under the standard value difference method, a flow volume value achieved at a certain point in time (e.g., a first flow volume value achieved at timing of initiation of a determination) is taken as a standard value. Flow volume differences Δq1, Δq2, and Δq3 from the standard value are consecutively computed at every timing corresponding to a pressure change, thereby determining an amount of change from the difference values. It is determined whether or not a following flow volume change is present, from the amount of flow volume change computed by any one of the methods.

The analysis unit 112 makes a determination showing that a following flow volume change is present or a determination showing that a following flow volume change is not present, through analysis of the following of the pressure change by the flow volume change, through use of any of the different methods. In the present embodiment, a determination showing "a following flow volume change is present" is made by use of the amount of flow volume change computed by the consecutive difference method. A determination showing that "a following flow volume change is not present" is made by use of the amount of flow volume change computed by the standard value difference method. The determination showing that "a following flow volume change is present" and the determination showing that "a following flow volume change is not present" are made by use of the mutually-different methods, whereby a determination can be made by a method appropriate for determination conditions for each state. Therefore, accuracy of a determination can be enhanced.

Figure 5:
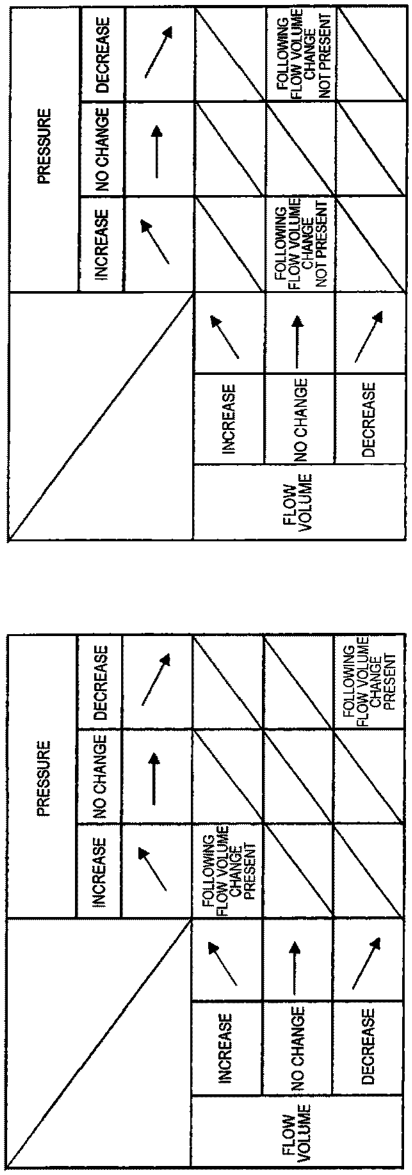
FIG. 5 is a view showing combinations of events used for determining whether or not a following flow volume change is present, in connection with combinations of a pressure change with a flow volume change.

FIG. 5 shows combinations of a pressure change with a flow volume change; namely, a combination that provides a determination showing that a following flow volume change is present and another combination that provides a determination showing that a following flow volume change does not is present. The determination showing that a following flow volume change is present is made in the case of a corresponding combination of phenomena compliant with the consecutive difference method shown in FIG. 5(*a*). The determination showing that the following flow volume change is not present is made when any of combinations of corresponding phenomena compliant with the standard value difference method shown in FIG. 5(*b*) is yielded. Specifically, a determination showing that a following flow volume change is present is made when flow volume has increased in response to a pressure increase and when flow volume has decreased in response to a pressure drop.

A method for fixing the determination about the following of the pressure change by the flow volume change is now described. FIG. 6 is a view for describing example methods for fixing a following flow volume change. FIG. 6(*a*) shows a threshold value for fixing; FIGS. 6(*b*1-1) and 6(*b*1-2) show example conditions for a simple fixing method, and FIGS. 6(*b*2-1) and 6(*b*2-2) are example conditions of a composite fixing method.

On occasion of a determination about following flow volume change being made according to the three categories "a following flow volume change is present," "a following flow volume change is not present," and "a following flow volume change is uncertain," a determination is made by classifying an amount of flow volume change ΔQi/Δqi following a pressure change into five categories A to E through use of the threshold value shown in FIG. 6(*a*). A range in which the amount of flow volume change ΔQi/Δqi is 100 L/h (liter/hour) or more is determined to be a range A. A range in which the amount of flow volume change ΔQi/Δqi varies from 50 to 100 L/h is determined to be a range B. A range in which the amount of flow volume change ΔQi/Δqi varies from −50 to 50 L/h is determined to be a range C. A range in which the amount of flow volume change ΔQi/Δqi varies from −100 to −50 L/h is determined to be a range D. A range in which the amount of flow volume change ΔQi/Δqi is −100 L/h or less is determined to be a range E. A symbol "− (minus)" prefixed to the amount of flow volume change shows that a flow volume change is opposite in direction to a pressure change. The numerals are mere examples and supposed to be set, as appropriate, in accordance with a phenomenon of interest.

When a determination showing "a following flow volume change is present" is fixed by the simple fixing method, the determination result is fixed under a determination condition shown in FIG. 6(*b*1-1) under the consecutive difference method. Specifically, when the amount of flow volume change falls in the range A "m" times or in the range B "n" times, the result of the determination showing "a following flow volume change is present" is fixed. The determination result is not fixed in other cases.

When the determination showing that a following flow volume change does not is present is fixed by means of the simple fixing method, the determination result is fixed under a determination condition shown in FIG. 6(*b*1-2) under the standard value difference method. Specifically, when the amount of flow volume change falls within the range C, the result of the determination showing that "a following flow volume change is not present" is fixed. The determination result is not fixed in other cases.

When the determination showing that a following flow volume change is present is fixed by means of the composite fixing method, the determination result is made by use of combinations of determination conditions shown in FIG. 6(*b*2-1). Specifically, the result of the determination showing "a following flow volume change is present" is fixed when the amount of volume change falls within the range A "m" times and does not fall within any of the ranges C, D, and E or when the amount of flow volume change falls within the range B "n" times and does not fall within any of the categories C, D, and E. The determination result is not fixed in other cases.

When the determination showing that a following flow volume change does not exit is fixed by means of the composite fixing method, the determination result is fixed by use of combinations of determination conditions shown in FIG. 6(*b*2-2). Specifically, when the amount of flow volume change falls in the range C and does not fall in any of the ranges A, B, and E or when the amount of change falls in the range C and does not fall within any of the ranges A and E, the result of the determination showing that "a following flow volume change is not present" is fixed. The determination result is not fixed in other cases.

They are mere example combinations of determination conditions employed for the composite fixing method. The combinations are supposed to be set, as appropriate, according to a phenomenon to which the method is applied.

In the simple fixing method shown in FIGS. 6(*b*1-1) and (*b*1-2) or the composite fixing method shown in FIGS. 6(*b*2-1) and (*b*2-2), a correlation of $m<n$ is present between the numbers of times the "m" and "n" used as the determination conditions. For instance, the number of times "m" and "n" are set, as required, like "m=1 and n=3."

In relation to the determination showing a following flow volume change, a predetermined determination period can be set on, such as a per-minute basis, an hourly basis, or a daily basis. A determination showing a following flow volume change can also be made in any of the determination periods, to thus fix a determination result. Alternatively, the following flow volume change can also be determined in an arbitrary period and without defining a particular determination period, and a result of the determination showing the following flow volume change can be fixed at a point in time when the determination condition is fulfilled by use of any of the determination conditions for the previously-described fixing methods. Using such determination methods makes it possible to make a determination showing the following flow volume change, as required, according to various conditions, such as a use environment of a gas, thereby determining a gas leak, or the like, with superior accuracy.

In order to practice a fluid measurement device and the fluid measurement method, such as those mentioned above, a program for letting an unillustrated computer (an arithmetic unit) perform processing pertaining to respective steps of the fluid measurement method is stored in the flow volume computing unit 110, the analysis unit 112, the processing unit 114, and the computer of the gas meter 100. Moreover, a fluid supply system including a source for supplying fluid, such as a gas, a monitoring center, and others, also belongs to the present invention as a fluid supply system using a fluid measurement device, a fluid measurement method, and a program executed by a computer.

As mentioned above, according to the present embodiment, it is possible to make a determination as to a leak, or the like, with high accuracy by: analyzing the following of a pressure change by a flow volume change and making a determination showing "a following flow volume change is present," "a following flow volume change is not present," or "a following flow volume change is uncertain." When the determination shows that a following flow volume change is present, a conceivable event pertaining to a state of gas consumption is that a gas appliance not having a governor, such as a gas hot plate, is in operation or that a gas is leaking. Making an appliance determination makes it possible to detect a leak from a determination showing that a following flow volume change is present. On this occasion, a magnitude correlation between an amount of pressure change of predetermined level or more and an amount of flow volume change is determined, whereby a following flow volume change is determined according to a range of the amount of flow volume change. As a result, it is possible to cope with complicate flow volume and pressure changes occurring in an actual use environment. Even in measurement data including complicate waveforms, a following flow volume change can be determined with high accuracy, so that an accuracy of determination can be enhanced. Further, a following flow volume change can be determined by means of simple arithmetic operation, such as an addition and a subtraction, and hence load stemming from computation during analysis of a flow volume can be lessened.

The present patent application is not limited to one described in connection with the present embodiment. The present invention is also planned to be susceptible to alterations and applications conceived by those who are skilled in the art on the basis of the descriptions of the specification and the well-known technology and falls within a range where protection is sought.

The present invention is based on Japanese Patent Application (JP-A-2008-058790) filed on Mar. 7, 2008, the entire subject matter of which is incorporated herein by reference.

INDUSTRIAL APPLICABILITY

The present invention yields an advantage of the ability to determine a leak, or the like, with superior accuracy from pressure and a flow volume acquired during use of fluid and is useful in detection of a leak performed by a flowmeter, such as a gas meter.

The invention claimed is:

1. A flowmeter comprising:

a flow measurement unit that measures a flow volume of fluid flowing through a flow path;

a pressure measurement unit that measures pressure of the fluid;

an analysis unit configured to:

detect, based on the measured pressure, whether there is a change in pressure of the fluid; and upon detection of a change in pressure of the fluid, determine, based on the measured flow volume, whether following the detected change in pressure a flow volume change is present, is not present, or is uncertain, according to a magnitude correlation between an amount of the change in pressure of a predetermined level or more and an amount of flow volume change; and a processing unit configured to perform corresponding processing according to a result of analysis performed by the analysis unit.

2. The flowmeter according to claim 1, wherein the analysis unit is further configured to compute the amount of flow volume change using a consecutive difference method for determining a difference between a value of a current flow volume and a value of a preceding flow volume at each predetermined timing, and determines the flow volume change following the change in pressure.

3. The flowmeter according to claim 1, wherein the analysis unit is further configured to compute the amount of flow volume change using a standard value difference method for determining a difference between a value of a current flow volume and a predetermined standard value at each predetermined timing, thereby determining the flow volume change following the change in pressure.

4. The flowmeter according to claim 1, wherein the analysis unit is configured to use a method when making the determination showing that a flow volume change following the change in pressure is present and another method when making the determination showing that a flow volume change following the change in pressure is not present, thereby determining the flow volume change following the change in pressure.

5. The flowmeter according to claim 4, wherein, in relation to the determination showing that a flow volume change following the change in pressure is present, the analysis unit is configured to compute the amount of flow volume change using a consecutive difference method for determining a difference between a value of a current flow volume and a value of preceding flow volume at each predetermined timing, thereby determining the flow volume change following the change in pressure.

6. The flowmeter according to claim 4, wherein, in relation to the determining showing that a flow volume change following the change in pressure is not present, the analysis unit is configured to compute the amount of flow volume change using a standard value difference method for determining a difference between a value of a current flow volume and a predetermined standard value at each predetermined timing, thereby determining the flow volume change following the change in pressure.

7. The flowmeter according to claim 1, wherein, based on a determination showing that a flow volume change follows a pressure change, the analysis unit is configured to determine whether a fluid leak is present.

8. The flowmeter according to claim 1, wherein the analysis unit is further configured to determine an appliance that uses fluid according to the measured flow volume and to determine whether a fluid leak is present based on a determination that a flow volume change follows a pressure change and that operation of an appliance not having a pressure regulator is not detected.

9. A flow volume measurement method comprising:

measuring a flow volume of fluid flowing through a fluid path by means of a flowmeter;

measuring pressure of the fluid by means of a barometer;

obtaining a measured flow volume of a fluid flowing through a fluid path and a measured pressure of the fluid;

detecting, based on the measured pressure, whether there is a change in the pressure of the fluid;

upon detection of a change in the pressure of the fluid, determining, based on the measured flow volume, whether following the detected change in pressure a flow volume change is present, is not present, or is uncertain according to a magnitude correlation between an amount of the change in pressure of a predetermined level or more and an amount of flow volume change; and performing corresponding processing according to the determination of whether a flow volume change following the change in pressure is present, is not present, or is uncertain.

10. A fluid supply system using the flowmeter defined in claim 1.

11. A fluid supply system using the flowmeter defined in claim 9.

* * * * *